US012250753B2

(12) United States Patent
Lewis et al.

(10) Patent No.: US 12,250,753 B2
(45) Date of Patent: Mar. 11, 2025

(54) HEATING DEVICE, APPLICATIONS THEREFORE, AN OHMICALLY RESISTIVE COATING, A METHOD OF DEPOSITING THE COATING USING COLD SPRAY AND A BLEND OF PARTICLES FOR USE THEREIN

(71) Applicant: 2D Heat Limited, St. Helens (GB)

(72) Inventors: John Frederick Lewis, St. Helens (GB); Marcus W. Rutherford, St. Helens (GB); Steven G. Keating, St. Helens (GB)

(73) Assignee: 2D HEAT LIMITED, St. Helens (GB)

( * ) Notice: Subject to any disclaimer, the term of this patent is extended or adjusted under 35 U.S.C. 154(b) by 1018 days.

(21) Appl. No.: 17/280,851

(22) PCT Filed: Sep. 27, 2019

(86) PCT No.: PCT/IB2019/058239
§ 371 (c)(1),
(2) Date: Mar. 26, 2021

(87) PCT Pub. No.: WO2020/065612
PCT Pub. Date: Apr. 2, 2020

(65) Prior Publication Data

US 2022/0046763 A1 Feb. 10, 2022

(30) Foreign Application Priority Data

Sep. 27, 2018 (GB) ...................................... 1815753

(51) Int. Cl.
*H05B 3/14* (2006.01)
*C23C 24/04* (2006.01)

(52) U.S. Cl.
CPC ............ *H05B 3/141* (2013.01); *C23C 24/04* (2013.01); *H05B 2203/013* (2013.01); *H05B 2203/032* (2013.01)

(58) Field of Classification Search
CPC .......... H05B 3/141; H05B 3/04; H05B 3/262; H05B 3/12; H05B 3/16; H05B 2203/013;
(Continued)

(56) References Cited

U.S. PATENT DOCUMENTS 3,922,386 A 11/1975 Ros
11,930,565 B1 * 3/2024 Skinner .................... H05B 3/34
(Continued)

FOREIGN PATENT DOCUMENTS

CN 107841744 A 3/2018
CN 115769672 A * 3/2023 ............ H05B 3/262
(Continued)

OTHER PUBLICATIONS

English abstract for CN-107841744.

*Primary Examiner* — Shawntina T Fuqua
(74) *Attorney, Agent, or Firm* — Fishman Stewart PLLC

(57) ABSTRACT

A heating device may include a substrate and a heating element disposed on a surface of the substrate. The heating element may include an ohmically resistive coating having a layer thickness of 2 to 300 microns. The ohmically resistive coating may include at least 30% by weight of at least one ductile or malleable metal and a plurality of electrically resistive particles. The ohmically resistive coating may be deposited via the at least one of the cold spray and the solid state deposition performed at a temperature below at least one of a melting temperature and a partially softening temperature of the at least one ductile or malleable metal. The ohmically resistive coating may exhibit less heterogeneity and porosity than a thermally sprayed coating, may have a density of 90% or greater, and may have a porosity of 10% or less.

36 Claims, 5 Drawing Sheets

(58) Field of Classification Search
CPC ........ H05B 2203/032; H05B 2203/017; H05B 2203/026; H05B 2214/02; C23C 24/04; C23C 30/00; H01C 7/021
See application file for complete search history.

(56) References Cited

U.S. PATENT DOCUMENTS

| | | | | |
|---|---|---|---|---|
| 2002/0096512 | A1 | 7/2002 | Abbott et al. | |
| 2003/0121906 | A1 | 7/2003 | Abbott et al. | |
| 2008/0075876 | A1 | 3/2008 | Boardman | |
| 2008/0271779 | A1 | 11/2008 | Miller et al. | |
| 2009/0272728 | A1 | 11/2009 | Abott | |
| 2009/0297132 | A1 | 12/2009 | Abbott | |
| 2011/0147205 | A1 | 6/2011 | Guay et al. | |
| 2011/0188838 | A1 | 8/2011 | Abbott | |
| 2014/0336046 | A1 | 11/2014 | Heinrich et al. | |
| 2018/0138494 | A1 | 5/2018 | Birt et al. | |
| 2018/0258539 | A1* | 9/2018 | Wilson | C23C 24/04 |
| 2020/0189229 | A1* | 6/2020 | Palmer | H05B 3/145 |
| 2022/0306888 | A1* | 9/2022 | Swisher | C09D 11/38 |

FOREIGN PATENT DOCUMENTS

| | | | | |
|---|---|---|---|---|
| GB | 2344042 | A | 5/2000 | |
| WO | WO-05079209 | A2 | 9/2005 | |
| WO | WO-06/043034 | A1 | 4/2006 | |
| WO | WO-08/081167 | A2 | 7/2008 | |
| WO | WO-09/150454 | A1 | 12/2009 | |
| WO | WO-14/184146 | A1 | 11/2014 | |
| WO | WO-2016084019 | A1 * | 6/2016 | A47J 37/06 |

* cited by examiner

HEATING DEVICE, APPLICATIONS THEREFORE, AN OHMICALLY RESISTIVE COATING, A METHOD OF DEPOSITING THE COATING USING COLD SPRAY AND A BLEND OF PARTICLES FOR USE THEREIN

CROSS-REFERENCE TO RELATED APPLICATIONS

This application claims priority to International Patent Application No. PCT/IB2019/058239, filed on Sep. 27, 2019, and Great Britain Patent Application No. GB 1815753.7, filed on Sep. 27, 2018, the contents of both of which are hereby incorporated in their entirety.

TECHNICAL FIELD

This invention relates to a heating device and applications thereof. It also relates to an ohmically resistive coating, a method of depositing the coating on a substrate using "cold spray" and a blend of particles for use therein.

The novel heating device includes a heating element comprising an ohmically resistive coating. The heating device and coating are produced using a low-cost manufacturing method referred to in the art as "cold spray" or "solid-state" deposition. The method deposits a novel blend of particles including (i) a ductile or malleable metal which deforms on impact with a substrate, adhering to the surface, and (ii) particles comprising one or more electrically resistive metal oxide, carbide, silicide, di-silicide, nitride, boride, or sulphide which become bound to produce an ohmically resistive coating on the substrate. A typical ratio of a ductile or malleable metal to electrically resistive particles will be from 2:1 to 1:2.

A skilled person will be able to differentiate a coating produced by cold spray from one produced by "melting" the particles, compare FIGS. 4*a-c* with FIG. 5, as under the microscope the "cold spray" coatings are less heterogenous than those resulting from processes which melt the particles.

The heating element can then be electrically powered, with an AC or DC source, to ohmically heat the coating in question.

BACKGROUND

Various techniques are known for producing surface coating heating elements using deposition techniques which heat one or more metals and/or oxides, carbides, silicides, di-silicides, nitrides, borides, and sulphides to a sufficiently high temperature, typically above 3,000° C., to enable the deposition process to take place via a semi-molten phase. Such a process, due to the high operating temperatures, places limitations on the substrate, and has cost implications, making the production of goods for many applications restrictively expensive.

These semi-molten phase applications, that use either powdered or wire fed feed-stocks, include inter alia flame-spraying using a range of oxy-fuel combustion gases, high velocity oxy-fuel techniques (HVOF) and plasma spraying devices, each operating at progressively higher operating temperatures and/or kinetic energy inputs. These techniques are well established commercially, but, have limitations in their applications, notably because, being high temperature applications, problems can arise from the uncontrolled release of in-built stresses in the substrate from the manufacturing process. This can lead to instability and distortion, particularly where larger surface lengths and or areas, namely ones of a magnitude of one square metre or more, are concerned, especially where the substrate is thin. Established custom and practice is to cool such sensitive substrates during the high temperature spraying process using water cooled platens, dry-ice baths, or the like, to cool the article being sprayed. Such measures are not always feasible or add complexity to the deposition process. In consequence productivity and production cost can both be negatively impacted, whilst the risk of producing poor quality articles is increased.

In PCT/GB2005/003949, PCT/GB2007/004999 and PCT/GB2009/050643 the applicant has described the production of electrical heating elements using flame spraying techniques. Whilst intended for the manufacture of various articles e.g. domestic white goods, commercial cooking appliances and big-science applications using Ultra-High Vacuum installations, the applicant has identified considerable new market opportunities, based on, for example, the application of ultra-slim surface coating heating elements onto, particularly, high grade architectural panels, comprising a mild steel core with a thin ceramic coating on one or both surfaces, such coating possessing high dielectric resistance strength, even when heated under appropriate electrical load to high temperatures, such as 400° C.

Current considered wisdom is that brittle or hard metal compounds or salts (such as one or more metals oxides and/or carbides, silicides, di-silicides, nitrides, borides, and sulphides) can't be deposited on a substrate by any means other than semi-molten phase applications, because the compounds or salts, being abrasive in nature, would otherwise destroy the surface on which they would be deposited. Indeed, it is accepted industrial practice when using cold-spray applications to include low percentages of brittle metal oxides to prepare and clean the surface being treated in order to better 'key' the subsequently applied ductile metal particles. Applicant has overcome this problem by co-depositing them with a ductile or malleable metal at a temperature below the melting point of the a ductile or malleable metal and by using sufficient ductile or malleable metal, typically at least 30% by weight, and more particularly at least 40% by weight, to bond the one or more metals oxides and/or carbides, silicides, di-silicides, nitrides, borides, and sulphides to the surface of the substrate.

The general state of the art falls into one of two groups:

High temperature, thermally sprayed techniques (not cold spray) and products include:

WO2016/084019 which discloses a resistive heater including at least one thermally sprayed resistive heating layer comprising a first metallic component that is electrically conductive, an electrically insulating derivative of the first metallic component and a third component that stabilizes the resistivity of the heating layer;

U.S. Pat. No. 3,922,386 which discloses a heating element produced by thermal spraying molten aluminium globules in an oxidising atmosphere;

GB2344042 which discloses a method of producing resistive heating elements by heating previously oxidised particles, so they become semi-molten and depositing them on a substrate; and US2008/0075876 which discloses a method of forming an electrical heating element using flame spraying.

In contrast to the above the following references relate to "cold spray" techniques and products:

WO2014/184146 teaches the cold spraying of metals, singularly or in alloys. The teaching is specific to producing ferromagnetic heating effects to 'nudge' temperatures above freezing point & thereafter cut-out because of the inherent Curie point temperatures that the combination of metal alloys are designed to bring. They cite a range of ferromagnetic metal alloys, notably Cu—Ni and Fe—Ni, with or without Cr, Al, Mn.

WO2005/079209 discloses the production of nanocrystalline layers. It teaches the use of metals and alloys and their reinforcement using ceramics to produce sintered compacts.

US2018/0138494 is directed to depositing cathode or anode materials using a cold spay process.

CN107841744 discloses the use of cold spray to produce ceramic doped metal based composite materials of nanoscale particles which are extensively pre-milled and vacuum dried. Following cold spray application, the surface is subjected to high speed friction processing. It does not teach the production of ohmically resistive coatings or heating devices.

None of the cold spray related disclosure teach the formation of heating elements by co-depositing particles of electrically resistive metal compounds or salts such as metal oxides with a ductile or malleable metal.

Applicant has, surprisingly, determined that it is possible to deposit brittle or hard metal compounds or salts, including those typically commercialised powder particles used in current thermal spraying applications, at what are considered low temperatures in the context of spray deposition (i.e. temperatures below their melting point) by depositing the brittle or hard metal compounds or salts together with a ductile or malleable metal or metals, at a temperature at which they remain as solids, at a controlled momentum, such that the ductile or malleable metal deforms on contact with the surface and the brittle or hard metal compounds or salts are embedded within the ductile or malleable metal without grit-blasting away the co-deposited ductile metal or the surface being applied thereon. The resulting coating adheres to the substrate.

In this regard the use of zinc, which has a melting point of about 419.5° C., as the ductile or malleable metal is particularly favoured, although higher melting point ductile or malleable metals, such as copper, aluminium and manganese may also be used.

The appearance of a cold spray deposited coating differs from that of one deposited in a semi-molten state. A skilled person will be able to differentiate a cold spray deposited coating from one produced in a semi-molten state as it will be less heterogenous in appearance under the microscope and will be less porous.

Applicant has, by applying these metal compounds or salts to the surface of substrates together with a ductile or malleable metal, been able to produce heating devices which can be used in a variety of applications including for space heating purposes in, for example, domestic, commercial and industrial premises.

Ideal substrates for such applications are architectural panels comprising a steel core with a thin ceramic coating, such as those obtained from Polyvision BV. Preferred panels include those sold as Polyvision Flex 1 or Flex 2 panels.

Preferred coatings include those produced from blending nickel oxide and zinc, though many other combinations have been successfully demonstrated.

Other heating applications include automotive applications, particularly in the electric and hybrid power-train fields for low wattage cabin heating appliances, aerospace applications for anti-icing and/or de-icing purposes, and construction industry applications, with the coatings being onto cementitious and other building materials.

SUMMARY

In accordance with a first aspect of the present inventions there is provided a heating device comprising a substrate with a surface having a heating element comprising an ohmically resistive coating which has been deposited on the surface of the substrate by cold spray, the ohmically resistive coating has a layer thickness of between 2 and 300 microns and comprises:

one or more ductile or malleable metals selected from: copper, gold, lead, aluminium, platinum, nickel, zinc, magnesium, iron, manganese, chromium, titanium, vanadium, niobium, indium, terbium, strontium, cerium, and lutetium; and particles comprising one or more electrically resistive metal oxide, carbide, silicide, di-silicide, nitride, boride, or sulphide, wherein the one or more ductile or malleable metals bond the particles to the surface of the substrate, and at least a pair of electrical contacts disposed thereon, which heating element, in operation, is connected to an AC or DC power supply.

Preferably the heating device comprises a plurality of heating elements each sharing a common feed terminal and having an independent return terminal.

The heating element may be connected to the AC or DC power supply by mechanical means, soldering, laser brazing and laser welding, additive manufacturing solid state deposition of ductile metals or by the use of electrically conductive adhesives or inks. The connections can be made at the respective ends and additionally at intermediate points along its length.

In one mode of operation the power supply is mains operated.

In a preferred mode of operation, the power supply is a low voltage supply operating in the range of 1 to 110 Volts, more preferably still below 30 Volts.

Preferably the substrate surface comprises a dielectric barrier material.

In a particularly favoured embodiment, the dielectric barrier material comprises a ceramic.

Preferably the substrate comprises a sheet material, most preferably an architectural panel.

The sheet material may comprise a steel core and a ceramic surface.

Alternatively, the sheet material may comprise ceramic, glass or mirrored glass.

The sheet may vary in size and comprise a heated surface area of between 150 $cm^2$ and 20,000 $cm^2$.

Preferably the heating element is a self-regulating resistance heating element.

The coating may also be "protected" by overlaying it with a protective layer. The protective layer may take the form of, for example, a film, a sheet, a coating, or an applied screed which may protect against wear, or penetration by e.g. water or substances corrosive to the heating element and to provide a degree of protection against accidental contact with such hot surfaces, or to protect against electric shock from accidental contact with an electrically live element.

Additionally, the protective/additional layer may be used to make cleaning easier being a low effort wipe-able surface and/or a thermal management coating.

In a particularly favoured embodiment, there is provided a vehicle comprising a heating element of the first aspect of the present invention.

In another particularly favoured embodiment, there is provided a building comprising a heating element of the first aspect of the present invention.

The heating device can be used to generate local heat or to provide protection from the cold.

Examples include, by way of illustration only:

Horizontal and vertical building structures, including all manner of domestic dwellings, including social housing, commercial buildings including offices, shops and retail centres, sporting complexes and industrial premises including logistics centres, workshops and the like;

Bridges, tunnels, covered walk-ways, bus and train stations, shelters and the like and designated external smoking areas;

Aircraft external panels or internal panels prone to exposure to low temperatures;

Railway tracks, more specifically points;

Stadium terracing and steps, runways, forecourts, roads and walkways;

Signs and advertising hoardings;

Industrial cold rooms and freezers; and

Carwashes, factories, airports, stables, farm and animal stock buildings, stadia, distribution, exhibition, and entertainment centres/complexes, warehouses and other large area/volume buildings.

Examples of building structures include, by way of example only:

Walls;

Ceilings;

Support columns;

Floors;

Roofs (undersides and exposed surfaces—to prevent snow/weight build-up), and

Functional heat generating units within the structures, including saunas, hot rooms, pizza and tandori ovens.

The structure may be made of many different materials. Preferred materials which may be treated include, building materials, such as, for example:

Cementitious, ceramic and like materials, including concrete;

Asphalt, bitumen and like oil based materials;

Plastics and polymers;

Composite materials; and

Metals, insulated metal surfaces and enamel.

The invention also provides a method of heating a space comprising supplying power to a heating device according to the first aspect of the invention.

Preferably the method of heating a space heats the coating to >90° C. in under 5 minutes.

Preferably the heat generated is primarily in the form of infra-red radiant heat energy.

Heat output can, to some degree, be controlled by track configuration. The tracks may be deposited in series, or parallel, or series parallel so as to generate an electrical resistance required to produce the desired heating output per unit area. Examples include:

For IR radiant room heaters, say, typically 400-800 Watts per $m^2$,

For walk-ways, signs, terracing, say, typically 200-300 Watts per $m^2$,

For building structures, say, typically 40-100 Watts per $m^2$,

For aircraft wings, say, typically 100-200 Watts per $m^2$, and

For electric vehicle cab heaters say, typically 400-800 Watts per $m^2$.

In accordance with a second aspect of the present invention there is provided an ohmically resistive coating comprising a layer which has been deposited on a surface of a substrate the layer has a thickness of between 2 and 300 microns and comprises:

i) one or more ductile or malleable metals selected from: copper, gold, lead, aluminium, platinum, nickel, zinc, magnesium, iron, manganese, chromium, titanium, vanadium, niobium, indium, terbium, strontium, cerium, and lutetium; and ii) particles comprising one or more electrically resistive metal oxide, carbide, silicide, di-silicide, nitride, boride, or sulphide, and wherein the one or more ductile or malleable metals bond the particles to the surface of the substrate.

Most preferably the layer has a thickness of between 20-70 microns.

Preferably the layer covers at least 10%, by area, of the surface of the substrate.

Most preferably the layer covers at least 50%, by area, of the surface of the substrate.

The layer may be deposited as single or multiple, separated or overlapping, track(s).

The coating can be deposited in a manner such that it can have constant dimensions (uniform width and thickness) or can be deposited in a variable manner such that the resistance (and consequential heating effect) at a given point or area can be controlled so that non-uniform effects can be achieved if desired. This can be done by changing the track's shape or configuration, for example, by altering the width or thickness of the deposit, and/or by changing the formulation and/or level of electrically resistive metal compound, particularly metal oxide present, or by changing the spacing between adjacent tracks. In this manner, it is, for example, possible to achieve greater heating effects, at the periphery of a structure compared to say it's centre or to provide separately controllable heating zones within a larger heater surface such that, when connected via an intelligent central control unit, a tuneable heating output can be obtained. A tuneable system can accommodate seasonal heating variations or provide improved energy efficiency during routine usage.

In accordance with a third aspect of the present inventions there is provided a blend, for cold spray or solid-state deposition, comprising:

i) at least one ductile or malleable metal, together with ii) particles comprising either of:

a) one or more metals and/or one or more metalloids together with compounds or salts thereof; or b) one or more metal or metalloid compounds or salts;

the at least one ductile or malleable metals being present in an amount, by weight, sufficient to allow the blend to form a coating on a surface of a substrate when deposited at temperatures below 1,000° C.

Preferably the one or more metal or metalloid compounds or salts comprise one or more of an oxide, carbide, silicide, di-silicide, nitride, boride, or sulphide.

Most preferably the one or more metal or metalloid compounds or salts is an oxide.

Preferably the one or more metal compound comprises: copper, gold, lead, aluminium, platinum, nickel, zinc, chromium, magnesium, iron, manganese, titanium, vanadium, niobium, indium, terbium, strontium, cerium, and lutetium.

Most preferably the one or more metal compound comprises nickel.

Preferably the one or more metalloid is selected from: boron, silicon, germanium, arsenic, antimony, tellurium and astatine.

Preferably the one or more ductile or malleable metal is selected from: gold, silver, aluminium, copper, tin, lead, zinc, iron, manganese, platinum, nickel, tungsten and magnesium.

Most preferably the one or more ductile or malleable metal is zinc or zinc in admixture with nickel.

The blend may comprise, by weight, from 10 to 90% of one or more ductile or malleable metals.

Most preferably the blend comprises from 40 to 60% of one or more ductile or malleable metals.

Typically, the particles comprising either of:

a) one or more metals and/or one or more metalloids together with compounds or salts thereof; or b) one or more metal or metalloid compounds or salts have a mean particle size of 0.1-150 microns.

Most preferably the particles have a mean particle size of from 5-35 microns.

In a particularly favoured embodiment, the particles comprise oxides of nickel, iron and/or chromium.

The one or more metals and/or one or more metalloids together with compounds or salts thereof may be obtained as, for example, pre-oxidised (or other) powders obtained by passing metal powders through a heating zone of a thermal deposition apparatus under an air atmosphere (or other appropriate gas) such that the metal powders become molten and oxidise (or other) to a controllable degree prior to being quenched, isolated and dried.

The electrically resistive metal oxides (carbide, silicide, di-silicide, nitride, boride, sulphide and other non-metal and/or metalloid or any combination of such) and admixtures of the same are preferably selected from those which exhibit an increase in resistance with increasing temperature.

In accordance with a fourth aspect of the present inventions there is provided a method of depositing a blend comprising i. at least one ductile or malleable metal together with ii. particles comprising either of:

a) one or more metals and/or one or more metalloids together with compounds or salts including salts thereof; or b) one or more metal or metalloid compounds or salts;

to form a coating on a surface of a substrate comprising the steps of causing the blend to adhere to the surface by:

i) feeding blend components into a cold spray apparatus; and ii) depositing blend particles via a heated, compressed, supersonic gas jet which accelerates the blend particles through a nozzle, at a temperature and pressure to the surface of the substrate which is positioned a distance from the nozzle, such that the blend particles adhere to the surface, forming a coating thereon.

The temperature may be between 100° C. and 1,200° C.

Most preferably the temperature is below 600° C.

More preferably still the temperature is below a temperature that would cause the melting or partial softening of the one or more ductile or malleable metal particles, so where zinc is used the temperature should be below 400° C.

Preferably the pressure is between 1 and 10 Atm.

Preferably the method is conducted absent of a vacuum.

Preferably the distance is less than 1 m, more preferably still between 1 and 30 cm.

Preferably the particles have a mean particle size of 0.1 to 150 microns, more preferably 15 to 35 microns.

Preferably the gas is air, oxygen, nitrogen, carbon dioxide, argon or neon, although other gases used in, for example, welding might be used.

BRIEF DESCRIPTION OF THE DRAWINGS

Embodiments of the invention are further described hereinafter with reference to the accompanying drawings, in which.

DETAILED DESCRIPTION

Figure 1:
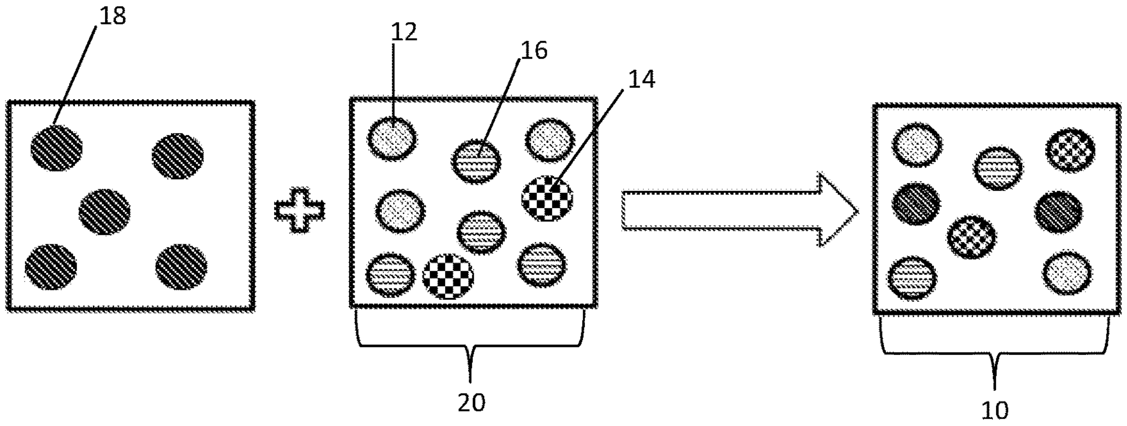
FIG. 1 is a diagrammatic representation of a blend formed from at least one ductile or malleable metal, together with particles comprising either of: a) one or more metals and/or one or more metalloids together with compounds or salts thereof; or b) one or more metal or metalloid compounds or salts.

Referring to FIG. 1 there is illustrated a blend (10), for cold spray or solid-state deposition, produced by mixing i) at least one ductile or malleable metal (18), typically as particles, with ii) particles (20) comprising a) one or more metals (12) and/or metalloids (14) together with compounds or salts thereof (16) or b) one or more metal or metalloid compounds or salts (16).

The blends (10) may be pre-mixed and introduced into a cold spay or other solid-state deposition apparatus for use in the method of the invention or may be introduced separately and mixed in situ.

Figure 2:
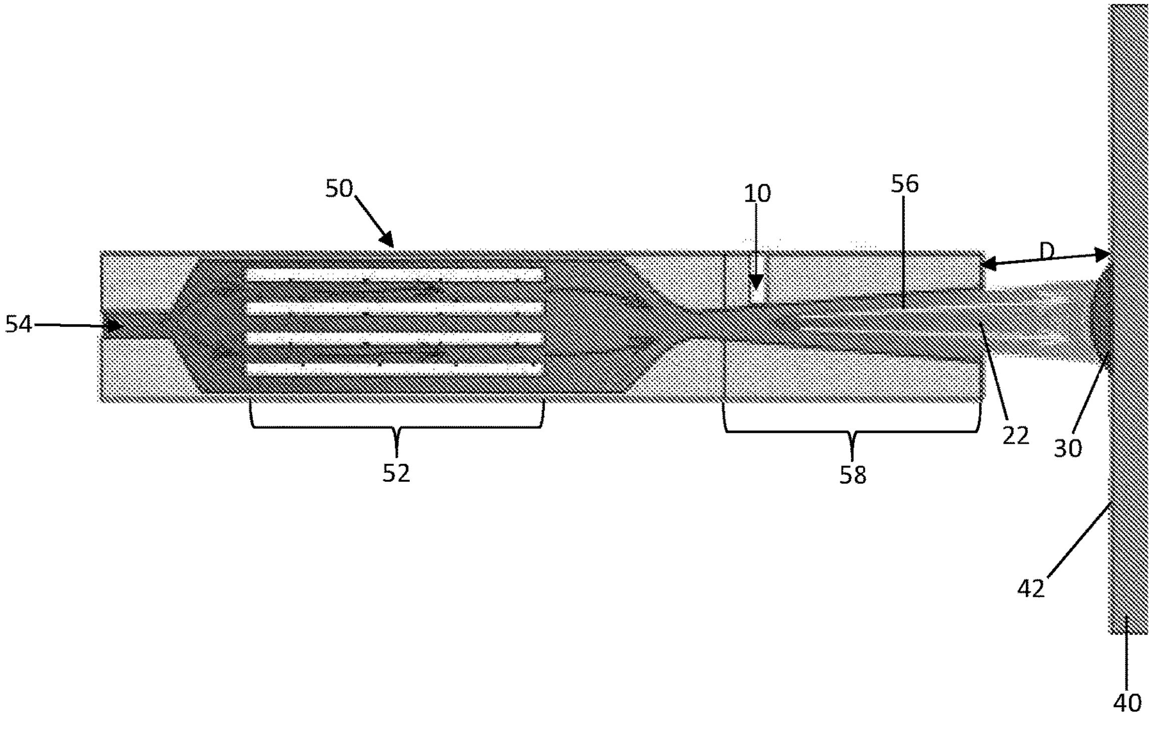
FIG. 2 illustrates an apparatus suitable for use in the method of the third aspect of the invention.

Referring to FIG. 2, the blend (10) may be fed into a cold spray apparatus (50) such that blend particles (22) pass into a heated (52), compressed (54), supersonic gas jet (56) where they are accelerated through a nozzle (58) at a temperature (T) and pressure (P) to the surface (42) of a substrate (40) which is positioned a distance (D) from the nozzle such that the blend particles (22) adhere to the surface (42) forming a coating (30).

Figure 3:
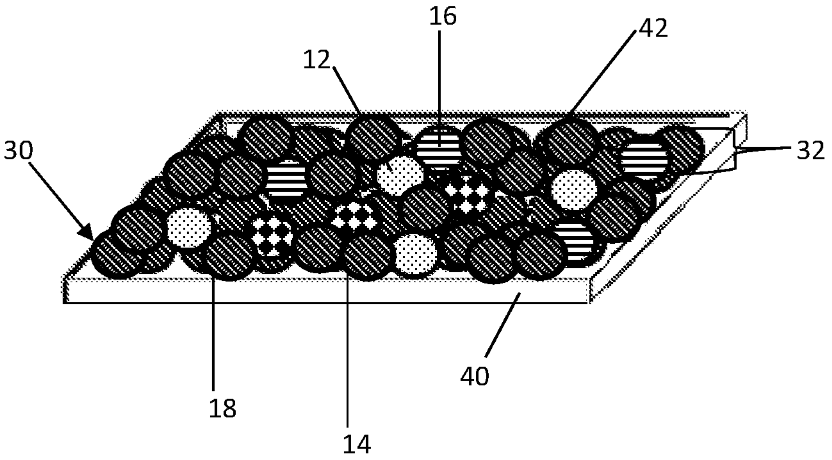
FIG. 3 is a diagrammatic representation of a coating of the invention deposited on a substrate.

The result is a coating (30), see FIG. 3, in which the i) at least one ductile or malleable metal (18) serves to "bond" ii) particles (20) comprising a) one or more metals (12) and/or metalloids (14) together with compounds or salts thereof (16) or b) one or more metal or metalloid compounds or salts (16) to the surface (42) of the substrate (40).

The cold spray coatings of the invention can be distinguished from those produced by thermal spray techniques, which melt the particles being deposited, by a person skilled in the art. Cold sprayed coatings exhibit less heterogeneity and porosity than those that are thermally sprayed.

Thermal spraying with HVOF, using highly ductile materials can achieve high density deposition with low porosity when operated at particularly high temperatures and velocities using very ductile components alone. However, the majority of thermal deposition techniques (such as flame spraying) or compositions sprayed result in very variable levels of density (in the range of between 50%-85%) (i.e. porosity levels of 15%-50%). Generally, the denser levels are achieved in regions (or in total coatings) where the level of ductile materials is particularly high, and the lower density (higher porosity) levels are achieved in areas where the (brittle) ceramic component(s) are more prominent.

In contrast, the levels of density achieved by cold spraying of the current ductile metals with brittle ceramic type components gives rise to overall levels of >90% density (<10% porosity).

Indeed, the porosity of the coatings of the invention may be less than 10%, through 8%, 6%, 4% to as little at 3%, 2% or 1%.

Figure 4A:
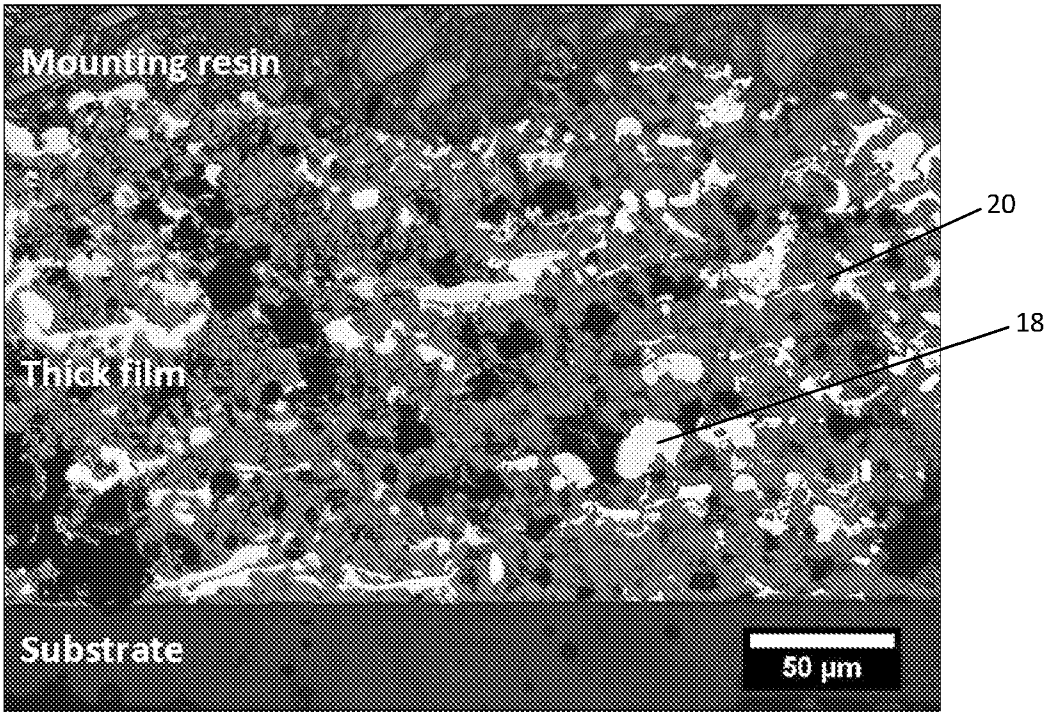
FIGS. 4*a* to 4*c* are microscope images, at increasing magnification, of a coating formed on a substrate by thermal spraying in which the particles are deposited in a semi molten state, as per the state of the art.
Figure 4B:
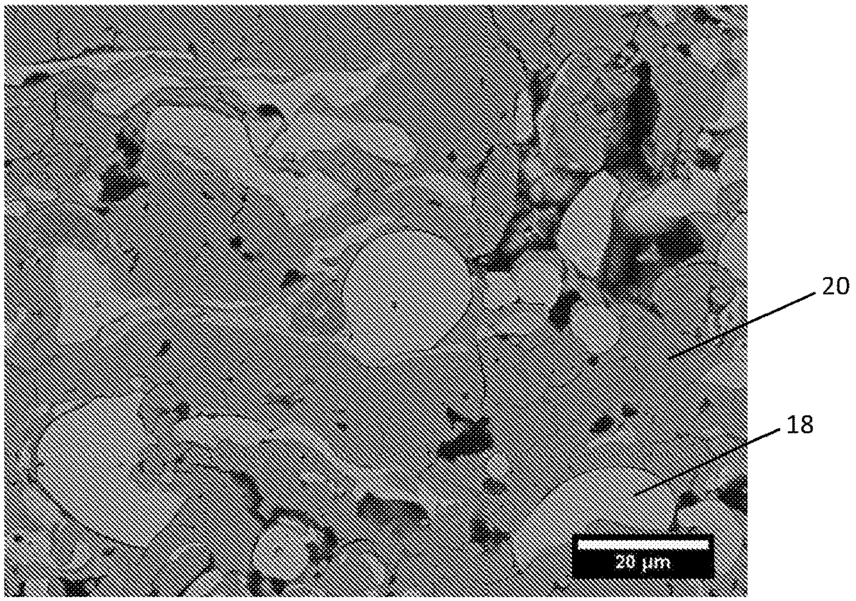
Figure 4C:
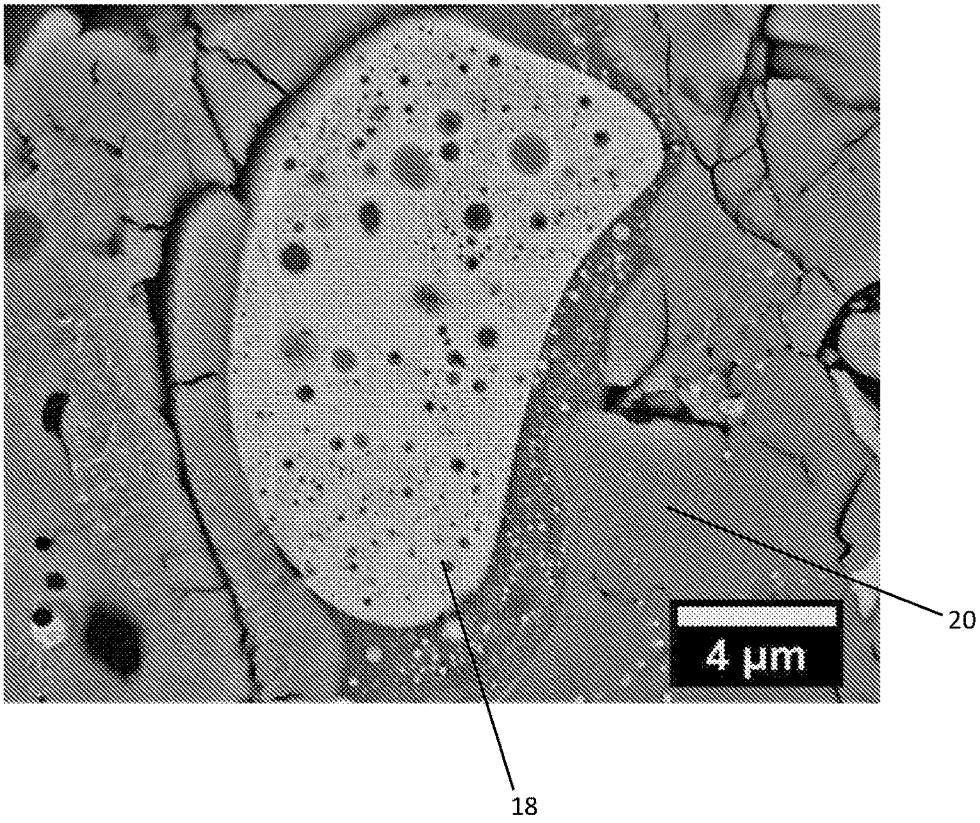

This is illustrated by a comparison of FIGS. 4*a-c* (a thermally sprayed coating) and FIG. 5*a* cold spray coating of the invention.

FIG. 4*a* shows the complex micro-structure of a flame-sprayed mixed metal/metal oxide deposit. There is a random distribution & separation of the different phases post thermal spraying. The metal particles (18), because of their higher back-scattered light reflectance, show as white. The mixed metal oxides (20) appear in grey tones, whilst the blacker regions are voids, or 'hollows', which give rise to the high overall porosity of these coatings.

The high (but variable) degree of distortion of the metal particles experienced during molten phase application becomes more apparent at higher magnifications. The particles range from being totally 'splatted' (by being exposed to higher temperature zones within the flame and/or shorter flight paths, with less opportunity to cool before impact), through differing degrees of deformation, to some that remain almost spherical. The most distorted species will have also undergone varying degrees of oxidation, reacting with the available ambient oxygen gas present in the flame, to also develop highly complex micro-structures both in and around the 'splats'.

FIG. 4*b* illustrates the surface from FIG. 4*a* at an increased magnification factor of ×2.5. The highly complex microstructures are more apparent within the metallic (lighter) zones (18) and the metal oxide (greyer) zones (20). The voids still show as darker areas.

FIG. 4*c* illustrates the coating at a ×5 magnification. The metallic region (18) shows porosity and is surrounded by a metal oxide shell region (20). Elemental mapping of region (18) shows high levels of nickel metal with the presence of embedded oxide particles, but which contain higher concentrations of iron & chrome oxides, both of which would be expected to react preferentially with the available oxygen present in the flame during the molten phase flight. Similarly, the high presence of small metallic particles, within the broken outer shell of the metal oxide phase, is to be noted. This clearly illustrates the complexity and the resulting heterogeneity of thermally sprayed deposits.

Figure 5:
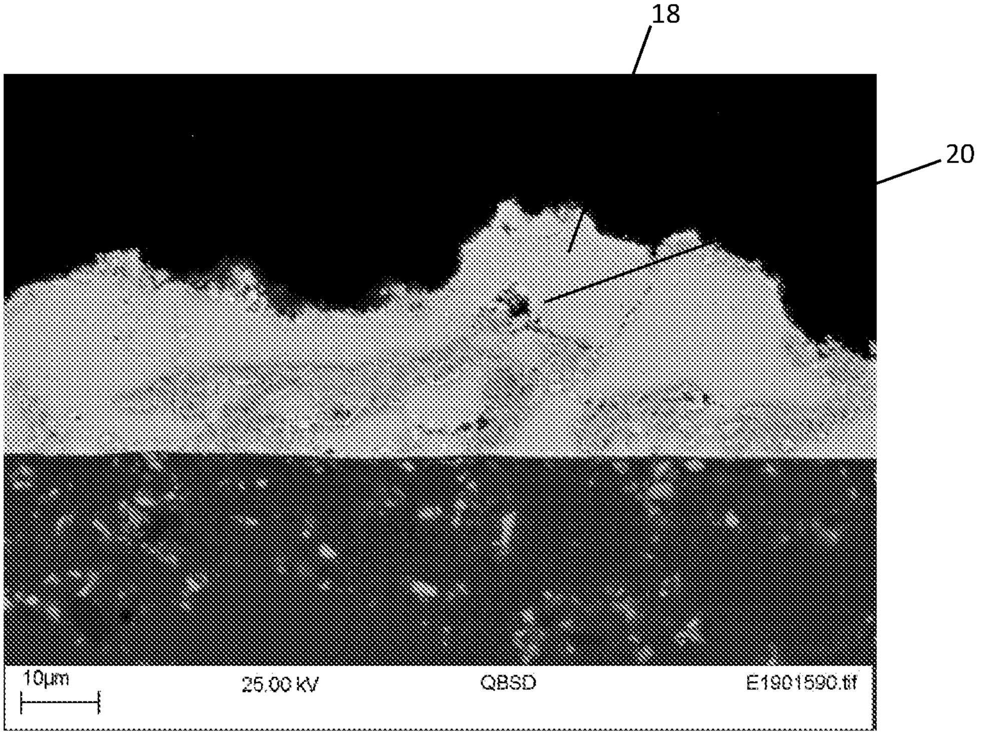
FIG. 5 is a microscope image of a coating formed on a substrate by cold spray in which the particles are deposited in a solid state, as per the invention.

These can be contrasted with the considerably less heterogeneous structures which result from using cold-spray application processes, which occur as solid state deposition processes, typified by the FIG. 5 illustration in which the metal oxide (20) particles are embedded in the ductile metal (18).

Whilst still heterogeneous in distribution, the constituent zones (i.e. electrically conductive, ductile metal zone & the electrically non-conductive, brittle metal oxide or metal salts zone) have not undergone any molten phase transition and have not accordingly chemically modified their respective compositions. The challenge in making such coatings is to carefully control the physical application conditions of the cold spray unit used, so as not to simply 'grit blast' away the substrate being coated and/or any material already deposited. This arises from the very nature of the brittleness of the metal oxides/metal salts, which are usually used as grit blasting powders to clean the surface of substrates when depositing 100% ductile metals.

By careful control of powder mixing and feeding through the cold-spray gun with defined ratios, applicant is able to achieve reproducible compositions with uniformity of heating performance.

In an exemplary method the blend (10) may be as illustrated in any of Examples 1 to 7.

Particles having a mean diameter of 5 to 35 microns are heated in a gas stream of air, to a temperature of below 600 C, and at a pressure of about 5 Atm where they leave the apparatus and travel a distance of between 8 mm-300 mm where they are deposited on a ceramic surface (42) where they form a coating (30) in a layer (32) with a thickness of about 45 microns.

Figure 6:
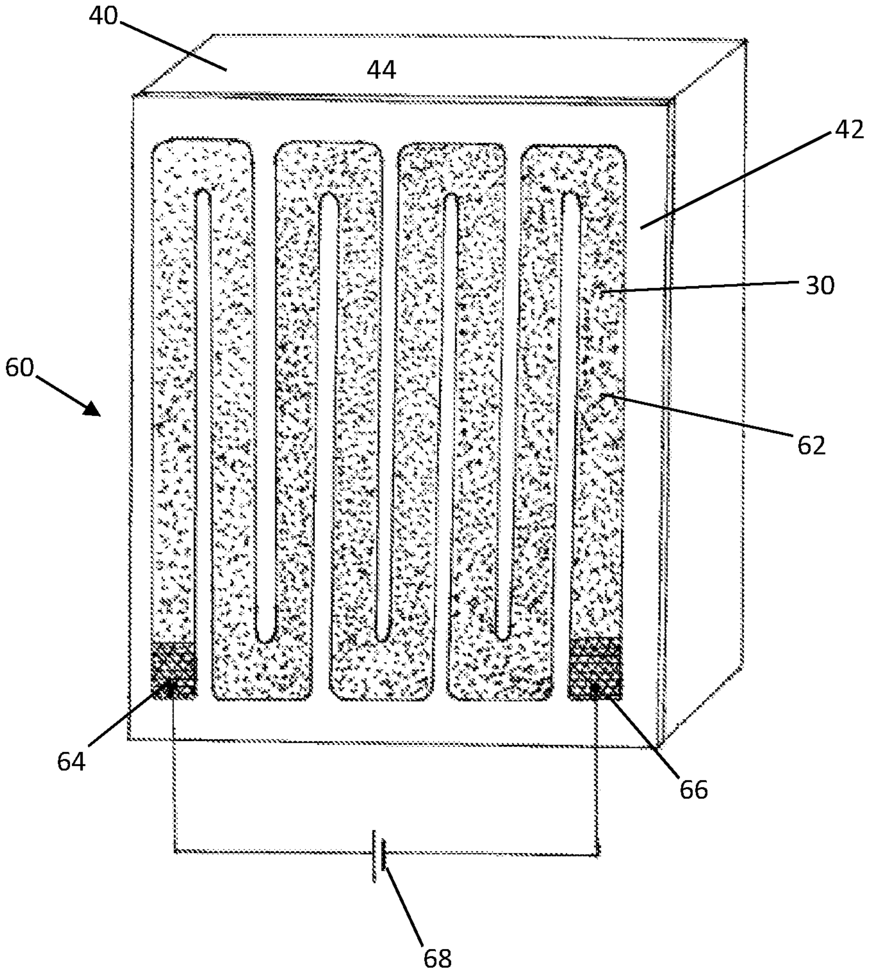
FIG. 6 illustrates a heating device according to a fourth aspect of the invention.

The coating (30) may be deposited in a controlled manner forming a track or tracks (44) which may form, for example, a functional component. Thus, as illustrated in FIG. 6, a heating device (60) comprises a steel substrate (40) with a ceramic surface (42) onto which has been deposited, in a tracked manner, a heating element (62) comprising, for example, a coating (30) comprising nickel oxide and zinc. A pair of electrical contacts (64; 66) is provided which can be connected to a power source (68) such that the heating device can be heated.

Alternatively, the arrangement may comprise a plurality of heating elements sharing a common feed terminal (64) and having independent return terminals (66).

The power source is preferably a low voltage supply of less than 30 V.

The heating device may be used in many different applications, but two particularly favoured applications are in vehicles such as, but not limited to, cars, lorries, trains, boats and airplanes and in buildings such as, but not limited to: houses, offices, hospitals, and warehousing.

To further exemplify the invention(s) there follow some exemplary blends, and details of their deposition onto substrates to form heating elements.

Example 1

A blend (10) of zinc metal powder (18), nickel metal powder (12) and alumina (16) powder in a mix, by weight, of 75:23:2 and with a particle size range of between 15 and 30 μm was deposited using a cold spray or solid state apparatus, at 10 mm separation onto a vitreous enamelled (42) steel substrate (40), using compressed air at 5.6 bar as the carrier gas, heated at ~600° C., as deposited parallel element tracks of some 0.45 cm width with a spray speed of 4 cm/sec. When a 20V AC power supply was connected across the length of the deposited element track, the latter heated to 120° C., drawing 4 amps of current.

Example 2

The same blend of zinc powder, nickel powder, and alumina, as used in Example 1, was blended 1:1 with a thermally pre-oxidised Inconel 600 alloy (to around 10% overall oxidation level and 45 μm to dust) at 5.6 bar pressure and was deposited using a 12 mm separation and 4 cps spraying speed onto a plasma sprayed alumina steel substrate, using compressed air as the carrier gas, heated at ~600° C., as deposited adjacent tracks to a total width of ~4.5 cm. When a 10V AC power supply was connected across the length of the deposited element track, the latter heated to 60° C., drawing 3 amps of current.

Example 3

A blend as per Example 2 was sprayed at 400° C. onto a toughened glass substrate using a 10 cm separation and an 8 cps traverse speed and deposited as parallel elements of some 0.45 cm width.

Example 4

A blend as in Example 2 was sprayed onto a SiN ceramic block at 600° C. and 5.6 bar pressure, using an 8 cm separation and 4 cps traverse speed, producing adjacent tracks to a total width of ~4.5 cm.

Example 5

A 4:1 blend of nickel oxide powder (16) (15□m) with zinc metal powder (18) at 600° C. and 4.4 bar pressure, using an 8 cm separation and 8 cps traverse speed, was sprayed onto a ceramic coated steel architectural panel, depositing parallel element tracks some 0.45 cm wide.

Example 6

A blend of zinc metal powder (18), nickel metal powder (12) and thermally pre-oxidised Inconel 600 alloy (16) as used in Example 2 was sprayed onto a ceramic coated steel architectural panel at 400° C. and 5.6 bar pressure, using an 8 cm separation and 12 cps traverse speed, depositing parallel element tracks some 0.45 cm wide. When a 40V DC power supply was connected across the length of the deposited element track, the latter heated to 110° C., drawing 2 amps of current.

Example 7

A 6:1 blend of a thermally pre-oxidised Inconel 600 alloy (16) as used in Example 2 and zinc metal powder (18) was sprayed onto a ceramic coated steel architectural panel at 570° C. and 5.6 bar pressure, using an 8 cm separation and 4 cps traverse speed, depositing parallel element tracks some 0.45 cm wide. When a 240V AC mains power supply was connected across the length of the deposited track, the latter heated to 250° C., drawing 0.9 amps of current.

The invention claimed is:

1. A heating device, comprising:

a substrate with a surface; and a heating element disposed on the surface, the heating element including an ohmically resistive coating deposited on the surface of the substrate via at least one of a cold spray and a solid state deposition, the ohmically resistive coating having a layer thickness of 2 to 300 microns and including:

at least 30% by weight of at least one ductile or malleable metal selected from a group including: copper, aluminium, zinc, and manganese; and a plurality of electrically resistive particles that include at least one of compounds and salts of at least one of a metal and a metalloid;

wherein the at least one ductile or malleable metal bonds the plurality of electrically resistive particles to the surface of the substrate to form the ohmically resistive coating;

wherein the ohmically resistive coating is formed via the at least one of the cold spray and the solid state deposition performed at a temperature below at least one of a melting temperature and a partially softening temperature of the at least one ductile or malleable metal;

wherein the ohmically resistive coating exhibits less heterogeneity and porosity than a thermally sprayed coating, has a density of 90% or greater, and has a porosity of 10% or less;

wherein the plurality of electrically resistive particles are disposed in the at least one ductile or malleable metal;

wherein at least a pair of electrical contacts are structured and arranged to connect to a power supply; and wherein the power supply includes at least one of an AC power supply and a DC power supply.

2. The heating device as claimed in claim 1, further comprising a plurality of heating elements, including the heating element, that each share a common feed terminal and that each have an independent return terminal.

3. The heating device as claimed in claim 1, wherein the power supply is a mains operated power supply.

4. The heating device as claimed in claim 1, wherein the power supply is a low voltage supply operating at least one of:

in a range of 1 to 110 Volts; and below 30 Volts.

5. The heating device as claimed in claim 1, wherein the surface includes a dielectric barrier material.

6. The heating device as claimed in claim 5, wherein the dielectric barrier material is a ceramic.

7. The heating device as claimed in claim 1, wherein the substrate includes a sheet material.

8. The heating device as claimed in claim 7, wherein the sheet material includes at least one of:

an architectural panel;

a steel core and a ceramic surface;

a glass sheet; and a mirrored glass sheet.

9. The heating device as claimed in claim 1, wherein the surface has a heated surface area of 150 $cm^2$ to 20,000 $cm^2$.

10. The heating device as claimed in claim 1, wherein the heating element is a self-regulating resistance heating element.

11. A vehicle, comprising the heating device as claimed in claim 1.

12. A building, comprising the heating device as claimed in claim 1.

13. An ohmically resistive coating, comprising a layer deposited on a surface of a substrate via at least one of cold spray and solid state deposition, the layer having a thickness of 2 to 300 microns and includes:

at least 30% by weight of at least one ductile or malleable metal selected from a group including: copper, aluminium, zinc, and manganese;

a plurality of electrically resistive particles that include at least one of compounds and salts of at least one of a metal and a metalloid;

wherein the at least one ductile or malleable metal bonds the plurality of electrically resistive particles to the surface of the substrate to form the ohmically resistive coating;

wherein the ohmically resistive coating is formed via the at least one of the cold spray and the solid state deposition performed at a temperature below at least one of a melting temperature and a partially softening temperature of the at least one ductile or malleable metal;

wherein the ohmically resistive coating exhibits less heterogeneity and porosity than a thermally sprayed coating, has a density of 90% or greater, and has a porosity of 10% or less;

wherein the plurality of electrically resistive particles are embedded in the at least one ductile or malleable metal.

14. The ohmically resistive coating as claimed in claim 13, wherein the thickness of the layer is 20 to 70 microns.

15. The ohmically resistive coating as claimed in claim 13, wherein the layer covers at least 10%, by area, of the surface of the substrate.

16. The ohmically resistive coating as claimed in claim 15, wherein the layer covers at least 50%, by area, of the surface of the substrate.

17. The ohmically resistive coating as claimed in claim 13, wherein the layer is deposited as at least one of a single track and a plurality of tracks.

18. A method of forming an ohmically resistive coating, comprising:

providing a blend including:

at least 30% by weight of at least one ductile or malleable metal selected from a group including: copper, aluminium, zinc, and manganese; and a plurality of electrically resistive particles including at least one of a metal and a metalloid together with compounds or salts thereof;

feeding the blend into at least one of a cold spray apparatus and a solid-state deposition apparatus; and adhering the blend to a surface of a substrate via depositing a plurality of blend particles of the blend with a heated, compressed, supersonic gas jet;

wherein depositing the plurality of blend particles with the gas jet includes accelerating the plurality of blend particles through a nozzle, at a temperature that is below at least one of a melting temperature and a partially softening temperature of the at least one ductile or malleable metal and at a pressure, to the surface of the substrate which is positioned a distance from the nozzle such that the plurality of blend particles adhere to the surface and form the ohmically resistive coating thereon;

wherein the ohmically resistive coating exhibits less heterogeneity and porosity than a thermally sprayed coating, has a density of 90% or greater, and has a porosity of 10% or less; and wherein the plurality of electrically resistive particles are embedded in the at least one ductile or malleable metal.

19. The method as claimed in claim 18, wherein the temperature is 600° C. or less.

20. The method as claimed in claim 18, wherein the pressure is 1 to 10 Atm.

21. The method as claimed in claim 18, wherein the method is conducted absent of a vacuum.

22. The method as claimed in claim 18, wherein the distance is at least one of:

less than 1 m; and 1 to 30 cm.

23. The method as claimed in claim 18, wherein the plurality of particles have a mean particle size of at least one of:

0.1 to 150 microns; and 15 to 35 microns.

24. The method as claimed in claim 18, wherein the gas is at least one of air, oxygen, nitrogen, carbon dioxide, argon, and neon.

25. A method of heating a space, comprising supplying power to the heating device claimed in claim 1.

26. The method as claimed in claim 25, further comprising heating the heating device to >90° C. in under 5 minutes.

27. The method as claimed in claim 25, wherein heat is generated primarily in the form of infra-red radiant heat energy.

28. The heating device as claimed in claim 1, wherein:

the compounds of the at least one of the metal and the metalloid include at least one of an oxide, a carbide, a nitride, and a boride; and the salts of the at least one of the metal and the metalloid include at least one of a silicide and a di-silicide.

29. The heating device as claimed in claim 1, wherein at least one of:

the temperature is 400° C. or less;

the at least one ductile or malleable metal is zinc; and the layer thickness of the ohmically resistive coating is 20 to 70 microns.

30. The ohmically resistive coating as claimed in claim 13, wherein the temperature is 600° C. or less.

31. The ohmically resistive coating as claimed in claim 13, wherein the temperature is 400° C. or less.

32. The ohmically resistive coating as claimed in claim 13, wherein the at least one ductile or malleable metal is zinc.

33. The method as claimed in claim 18, wherein the at least one ductile or malleable metal is zinc.

34. The method as claimed in claim 18, wherein the ohmically resistive coating has a thickness of 20 to 70 microns.

35. An ohmically resistive coating, comprising a layer deposited on a surface of a substrate via at least one of cold spray and solid state deposition performed at a temperature of 400° C. or less, wherein:

the layer includes:

at least 30% by weight of zinc; and a plurality of electrically resistive particles that include at least one of compounds and salts of at least one of a metal and a metalloid;

the plurality of electrically resistive particles are embedded in the zinc and the zinc bonds the plurality of electrically resistive particles to the surface of the substrate; and the layer exhibits less heterogeneity and porosity than a thermally sprayed coating, has a porosity of 10% or less, and has a thickness of 2 to 300 microns.

36. The ohmically resistive coating as claimed in claim 35, wherein the thickness of the layer is 20 to 70 microns.

* * * * *